(12) United States Patent
Abi-Nassif et al.

(10) Patent No.: US 7,626,926 B2
(45) Date of Patent: Dec. 1, 2009

(54) TRAFFIC MANAGEMENT IN A WIRELESS DATA NETWORK

(75) Inventors: Firas Abi-Nassif, Medford, MA (US); Sae-Young Chung, Daejeon (KR)

(73) Assignee: Airvana, Inc., Chelmsford, MA (US)

( * ) Notice: Subject to any disclaimer, the term of this patent is extended or adjusted under 35 U.S.C. 154(b) by 452 days.

(21) Appl. No.: 11/007,899

(22) Filed: Dec. 9, 2004

(65) Prior Publication Data

US 2006/0126509 A1 Jun. 15, 2006

(51) Int. Cl.
*H04J 1/16* (2006.01)

(52) U.S. Cl. ........................... 370/229; 370/232

(58) Field of Classification Search ............. 370/389, 370/349, 229–231, 235, 235.1, 232, 236, 370/253, 233, 234, 310, 328, 310.2, 338
See application file for complete search history.

(56) References Cited

U.S. PATENT DOCUMENTS

| | | | | |
|---|---|---|---|---|
| 4,769,810 A * | 9/1988 | Eckberg et al. | ............. | 370/232 |
| 5,289,462 A * | 2/1994 | Ahmadi et al. | ............. | 370/232 |
| 5,359,593 A * | 10/1994 | Derby et al. | ............. | 370/234 |
| 5,901,138 A * | 5/1999 | Bader et al. | ............. | 370/229 |
| 6,240,067 B1 * | 5/2001 | Sorber | ................ | 370/236 |
| 6,690,645 B1 * | 2/2004 | Aweya et al. | ............. | 370/230 |
| 6,711,144 B1 | 3/2004 | Kim et al. | | |
| 6,731,618 B1 | 5/2004 | Chung et al. | | |
| 6,741,862 B2 | 5/2004 | Chung et al. | | |
| 6,781,999 B2 | 8/2004 | Eyuboglu et al. | | |
| 6,948,108 B1 * | 9/2005 | Ludwig et al. | ............. | 714/748 |
| 7,088,678 B1 * | 8/2006 | Freed et al. | .............. | 370/230 |
| 7,170,871 B2 | 1/2007 | Eyuboglu et al. | | |
| 7,200,391 B2 | 4/2007 | Chung et al. | | |
| 7,242,958 B2 | 7/2007 | Chung et al. | | |
| 7,277,446 B1 * | 10/2007 | Abi-Nassif et al. | ............. | 370/412 |
| 7,299,278 B2 | 11/2007 | Ch'ng | | |
| 7,394,764 B2 * | 7/2008 | Ramani et al. | ............. | 370/231 |
| 2002/0196749 A1 | 12/2002 | Eyuboglu et al. | | |
| 2003/0100311 A1 | 5/2003 | Chung et al. | | |
| 2003/0112754 A1 * | 6/2003 | Ramani et al. | ............. | 370/230 |
| 2004/0071086 A1 * | 4/2004 | Haumont et al. | ............. | 370/230 |
| 2004/0190449 A1 * | 9/2004 | Mannal et al. | ............. | 370/229 |
| 2005/0068967 A1 * | 3/2005 | Terry et al. | ............. | 370/395.52 |

(Continued)

OTHER PUBLICATIONS

TIA/EIA/IS-856, "cdma2000, High Rate Packet Data Air Interference Specification", Jul. 13, 2001.

(Continued)

*Primary Examiner*—Brenda Pham
(74) *Attorney, Agent, or Firm*—Fish & Richardson P.C.

(57) ABSTRACT

In a radio access network (e.g., a cellular network), a radio node is configured to monitor one or more characteristics of a stream of data packets destined for an access terminal (e.g., a cellular telephone, laptop computer, etc.) to determine whether there is congestion in a network supplying the stream of data packets. If the radio node detects congestion, the radio node transmits a congestion alert to another device to cause the rate at which data enters the network to be slowed. The rate may be slowed either directly (e.g., by an upstream device which slows the rate at which the upstream device supplies the data to the network) or indirectly (e.g., by a downstream device which requests a slower delivery of data from the radio node).

27 Claims, 3 Drawing Sheets

U.S. PATENT DOCUMENTS

| | | |
|---|---|---|
| 2005/0180415 A1* | 8/2005 | Cheung et al. ............... 370/389 |
| 2005/0213555 A1 | 9/2005 | Eyuboglu et al. |
| 2005/0243749 A1 | 11/2005 | Mehrabanzad et al. |
| 2005/0245279 A1 | 11/2005 | Mehrabanzad et al. |
| 2006/0067422 A1 | 3/2006 | Chung |
| 2006/0067451 A1 | 3/2006 | Pollman et al. |
| 2006/0126509 A1 | 6/2006 | Abi-Nassif |
| 2006/0159045 A1 | 7/2006 | Ananthaiyer et al. |
| 2006/0240782 A1 | 10/2006 | Pollman et al. |
| 2006/0291420 A1 | 12/2006 | Ng |
| 2006/0294241 A1 | 12/2006 | Cherian et al. |
| 2007/0026884 A1 | 2/2007 | Rao |
| 2007/0058628 A1 | 3/2007 | Rao et al. |
| 2007/0077948 A1 | 4/2007 | Sharma et al. |
| 2007/0097916 A1 | 5/2007 | Eyuboglu et al. |
| 2007/0115896 A1 | 5/2007 | To et al. |
| 2007/0140172 A1 | 6/2007 | Garg et al. |
| 2007/0140184 A1 | 6/2007 | Garg et al. |
| 2007/0140185 A1 | 6/2007 | Garg et al. |
| 2007/0140218 A1 | 6/2007 | Nair et al. |
| 2007/0155329 A1 | 7/2007 | Mehrabanzad et al. |
| 2007/0220573 A1 | 9/2007 | Chiussi et al. |
| 2007/0230419 A1 | 10/2007 | Raman et al. |
| 2007/0238442 A1 | 10/2007 | Mate et al. |
| 2007/0238476 A1 | 10/2007 | Raman et al. |
| 2007/0242648 A1 | 10/2007 | Garg et al. |
| 2007/0248042 A1 | 10/2007 | Harikumar et al. |
| 2008/0003988 A1 | 1/2008 | Richardson |
| 2008/0013488 A1 | 1/2008 | Garg et al. |
| 2008/0062925 A1 | 3/2008 | Mate et al. |
| 2008/0065752 A1 | 3/2008 | Ch'ng et al. |
| 2008/0069020 A1 | 3/2008 | Richardson |
| 2008/0069028 A1 | 3/2008 | Richardson |
| 2008/0076398 A1 | 3/2008 | Mate et al. |
| 2008/0117842 A1 | 5/2008 | Rao |
| 2008/0119172 A1 | 5/2008 | Rao et al. |
| 2008/0120417 A1 | 5/2008 | Harikumar et al. |
| 2008/0139203 A1 | 6/2008 | Ng et al. |
| 2008/0146232 A1 | 6/2008 | Knisely |
| 2008/0151843 A1 | 6/2008 | Valmikam et al. |
| 2008/0159236 A1 | 7/2008 | Ch'ng et al. |
| 2008/0162924 A1 | 7/2008 | Chinitz et al. |
| 2008/0162926 A1 | 7/2008 | Xiong et al. |

OTHER PUBLICATIONS

TIA/EIA/IS-2001-A, "Interoperability Specification (IOS) for CDMA2000 Network Access Interfaces", Oct. 2001.

TIA/EIA/TSB-115, "cdma2000 Wireless IP Architecture Based on IETF Protocols (2000)," Dec. 1, 2001.

TIA/EIA/IS-835-B, "cdma2000 Wireless IP Network Standard", Oct. 28, 2002.

Network Working Group Request for Comments (RFC) 3168, "The Addition of Explicit Congestion Notification (ECN) to IP", Sep. 2001.

Floyd and V. Jacobson, "Random Early Detection Gateways for Congestion Avoidance", IEEE/ACM Transactions on Networking V. 1, N. 4, Aug. 1993, pp. 397-413.

* cited by examiner

TRAFFIC MANAGEMENT IN A WIRELESS DATA NETWORK

FIELD

This disclosure relates to traffic management in a wireless data network.

BACKGROUND

In a radio access network such as a cellular network, network packets are often routed across a backhaul network before being transmitted to an access terminal (e.g., a cellular phone, personal data assistant, laptop computer, etc.) via an air link. If the rate of delivery across the air links exceeds the capacity of the network, the network can become congested.

SUMMARY

In one aspect, the invention features a method that includes detecting congestion occurring at one or more communications nodes along the path from the RNC to the RN, and reacting to this condition by reducing the data rate that the RNC sends to the RN.

Various implementations may include one or more of the following features. The transmitted packets may be physical layer packets. The transmission may be controlled based on a time-division multiplexing algorithm. The node may include a radio node of a communications protocol. The communications protocol may be 1xEV-DO. The transmission rates may be determined by the recipients. The transmission rates may be sent by the recipients using a feedback channel to the node.

In another aspect, the invention features a method for reducing congestion in a radio access network that includes monitoring congestion in a stream of data packets that are received at a radio node from a network and that are to be sent over an air link to one or more access terminals and reducing a rate at which the stream of data packets are sent over the network to the radio node in response to the monitoring.

Various implementations may include one or more of the following features. Monitoring the congestion may include monitoring for a gap in the sequential numbering of data packets received at the radio node or determining how long it takes at least some of the data packets to travel over the network. Monitoring the congestion may also include determining how many received packets over time have been marked by a network device with an indicator that the network device is experiencing congestion.

Reducing the rate at which packets enter the network can be done by a radio network controller using a leaky bucket mechanism. The leaky bucket mechanism may use a counter that is incremented at a rate of R bytes per second and decremented by an amount proportional to a size of a packet that is transmitted to the network, and be configured to prevent packets from entering the network if the counter reaches zero. Reducing the rate at which packets enter the network can also be done by marking a data packet with information that signals an access terminal to reduce the rate at which the access terminal requests delivery of data over the air link or replacing content of a data packet with random data that causes an access terminal to reduce the rate at which the access terminal requests delivery of data over the air link. The rate may also be reduced by dropping packets destined for an access terminal prior to entering the network and prior to the packets receiving a sequential number. All of these techniques either avoids dropping data packets or, if packets are dropped, then prevents an access terminal from requesting re-transmission of a dropped data packet (which tends to exacerbate a congestion condition).

In another aspect, the invention features a radio access network that includes a backhaul network, a radio network controller configured to receive a stream data packets destined for an access terminal and transmit the stream to a radio node using the backhaul network, and a radio node configured to monitor congestion of the received stream of data packets. The radio access network is configured to cause a reduction in a rate at which the stream of data packets enter the backhaul network in response to the monitoring.

Various aspects of the invention may include one or more of the following features. The radio node may monitor congestion by looking for a gap in the sequential numbering of the received data packets or determining how long it took at least some of the data packets to travel over the network. The radio node may also monitor congestion determining how many received packets over time have been marked by a network device with an indicator (e.g., an Explicit Congestion Notification (ECN) flag) an that the network device in the backhaul network is experiencing congestion.

The radio access network may reduce the rate at which packets enter the network can be done by using a leaky bucket mechanism on a device, such as a radio network controller, that supplies packets to the backhaul network. The radio access network may also cause a reduction in the rate at which packets enter the network by marking a data packet with information that signals an access terminal to reduce the rate at which the access terminal requests delivery of data over the air link (e.g., setting an ECN flag) or replacing content of a data packet with random data that causes an access terminal to reduce the rate at which the access terminal requests delivery of data over the air link. The rate may also be reduced by dropping packets destined for an access terminal prior to entering the network and prior to the packets receiving a sequential number.

In another aspect the invention features a radio node configured to receive a stream of data packets from a backhaul network and transmit the stream to an access terminal via an air link. The radio node includes a congestion monitor configured monitor congestion in the stream of data packets received from the backhaul network and a messaging module that transmit a signal to another device (e.g., a radio network controller or an access terminal) that uses the backhaul network to cause the device to reduce the rate at which the stream of data packets enter the backhaul network.

The details of one or more embodiments of the invention are set forth in the accompanying drawings and the description below. Other features, objects, and advantages of the invention will be apparent from the description and drawings, and from the claims.

DESCRIPTION

Figure 1:
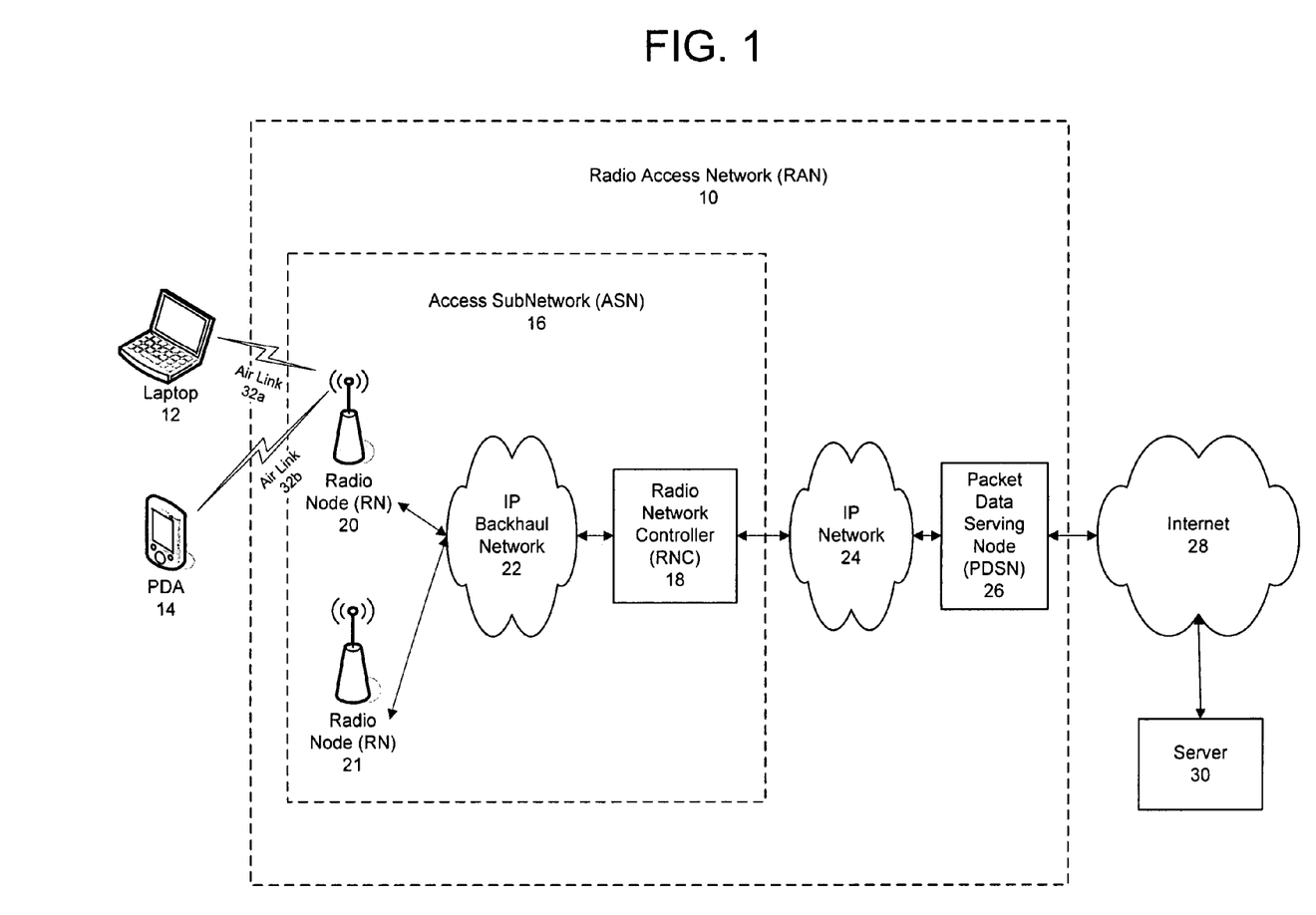
FIG. 1 is a diagram of a radio access network.

As shown in FIG. 1, a wireless radio access network (RAN) 10 uses the 1xEvolution Data Optimized (1xEV-DO) protocol to transmit data packets between a mobile Access Terminal (AT), such as laptop 12 and personal data assistant (PDA) 14, and the Internet 28.

The 1xEV-DO protocol is a standard wireless air interface developed by the Third Generation Partnership Project 2 (3GPP2), which is a collaborative Third Generation (3G) telecommunications specification-setting project responsible for developing the next generation of cdma2000® wireless communications. The 1xEV-DO protocol has been standardized by the Telecommunication Industry Association (TIA) as TIA/ELA/IS-856, "cdma2000, High Rate Packet Data Air Interface Specification", Jul. 13, 2001, which is incorporated herein by reference.

Using the 1xEV-DO protocol, a system, such as the radio access network 10 in FIG. 1, can deliver a shared forward air link transmission rate of up to 2.46 Mbits/s per sector using only 1.25 MHz of spectrum. The 1xEV-DO standard is also compatible with CDMA2000 radio access (see TIA/EIA-IS-2001-A, "Interoperability Specification (IOS) for CDMA2000 Network Access Interfaces," October 2001, which is incorporated herein by reference) and wireless IP network interfaces (see, TIA/EIA/TSB-115, "cdma2000 Wireless IP Architecture Based on IETF Protocols (2000)", Dec. 1, 2000, and TLA/EIA/IS-835-B, "cdma2000 Wireless IP Network Standard", Oct. 28, 2002, both incorporated herein by reference). Because 1xEV-DO is compatible with these standards, a 1xEV-DO network can be built entirely on Internet Protocol (IP) technologies, all the way from the mobile Access Terminal (AT) to the global Internet.

Referring again to FIG. 1, an Access Terminal (AT), such as laptop 12, PDA 14, or a dual mode voice/data handset (not shown), is a device which supports the 1xEV-DO protocol.

The 1xEV-DO Radio Access Network (RAN) 10, which may cover a large service area of an operator, includes one or more Access SubNetworks (ASN's), e.g., ASN 16, each anchored by a Radio Network Controller (RNC) 18 communicating with several Radio Nodes (RN's) 20, 21 using a private or public IP backhaul network 22. The IP backhaul network 22 includes several communication nodes (not shown), which may be implemented as routers or switches. Each RN may support multiple sectors, with each sector covering a certain cell area around the RN.

ASN 16 is connected over a public or private IP network 24 to one or more Packet Data Serving Node's (PDSN's), e.g., PDSN 26. A PDSN can be viewed as an edge router that supports mobility; it maintains link layer connectivity to AT's through the RAN.

When PDSN 26 receives IP packets from the Internet 28, PDSN 26 identifies the AT to which each packet is destined, then encapsulates each packet into a PDSN-to-RNC tunnel IP packet and sends this packet to the RNC that is servicing the AT, e.g., RNC 18.

RNC 18 extracts the payload data from the PDSN-to-RNC tunnel packets arriving from PDSN 26, and constructs from the payload data 1xEV-DO application-layer frames according to the 1xEV-DO protocol stack. The 1xEV-DO protocol stack includes a layer called the Radio Link Protocol (RLP) layer that assigns to each payload octet arriving from the PDSN a sequence number termed RLP sequence number. RLP sequence numbers are incremented by one for every octet and are used by the receiving AT to detect losses that could occur in the RAN. The 1xEV-DO application layer frames are then encapsulated into RNC-to-RN tunnel IIP packets and sent towards the RN such as RN 20. The RNC also marks each RNC-to-RN tunnel packet with a sequence number called Abis sequence number. The Abis sequence numbers are incremented by one for every RNC-to-RN tunnel packet.

When an RN receives the sequenced RNC-to-RN tunnel packets from the RNC, the RN retrieves the 1xEV-DO application layer payload and constructs the 1xEV-DO Physical Layer packets to be transmitted to the target AT over an air-link, e.g., air-link 32a, 32b.

A RN transmits packets to an AT at a bit rate selected by the AT as a function of the signal-to-interference (SIR) ratio observed by the AT over the sector where the AT is located. Therefore, the total data rate (or throughput) over a sector depends on the rate selected by all the ATs served by this sector. Since the SIR observed by an AT varies over time, the total sector throughput also varies over time. Since a single RN typically supports multiple sectors, the total data rate arriving at an RN in the forward direction also varies over time. Consequently, the total rate of the forward-direction traffic that is routed to an RN by IP backhaul network (e.g., IP backhaul network 22 shown in FIG. 1) also varies with time. If an IP backhaul network becomes congested, i.e., when the aggregate forward-direction data rate handled by the IP backhaul network exceeds the network's capacity, data packets will get dropped in the IP backhaul network. Moreover, when a packet is dropped, a 1xEV-DO-compliant AT will automatically request re-transmission of the dropped packet, which can lead to additional congestion in the IP backhaul network.

To reduce congestion in the IP backhaul network 22, each RN in an ASN monitors the stream of RNC-to-RN tunnel IP packets for signs of congestion in the IP backhaul network. If congestion is detected by an RN, the RN transmits a congestion message to an upstream device such as RNC 18 or PDSN 26. Upon receiving a congestion message, the upstream device will perform one or more actions that cause the rate at which packets are fed into the IP backhaul network 22 to be reduced. By reducing the rate at which packets enter the backhaul network, congestion within the network will be reduced. Once congestion has been reduced or eliminated, the rate at which packets enter the IP backhaul network can be increased. In other configurations, the RAN is configured to reduce congestion in the IP backhaul network by dropping packets in a manner that prevents the AT from requesting retransmission of the dropped packets.

In some implementations, the RN 20 monitors the incoming stream of RNC-to-RN tunnel IP packets for signs of congestion by monitoring both (i) the one-way-delay experienced by RNC-to-RN tunnel IP packets (ii) any gaps in Abis sequence numbers (which would indicate a dropped packet in the backhaul network).

To monitor the one-way-delay experienced by RNC-to-RN tunnel IP packets across the IP backhaul network, an RN includes a delay estimator that uses a sliding window of packet delay values to estimate the current average one-way delay experienced by the RNC-to-RN tunnel packets. Packet delay values are determined by the difference between a time stamp placed on the packet by the RNC prior to entry in the IP backhaul network and the time at which the RN receives the packet. The delay estimator sums the delay values of an array of sequential packets and divides the total by the number of packets in the array to obtain the average delay value. As a new packet is received, the delay estimator updates the sum of delay values by subtracting from the latest sum the oldest delay value in the array and adding to the subtraction result sum the newest delay value in the array. The average one-way delay is then obtained by dividing the current sum of the delays by the array size. Choosing the array size to be a power of two will render the computation of the average one-way delay more efficient than an array size that is not a power of two since a dividing by a number to the power of two in the binary system involves shifting the bits of the dividend.

By monitoring the average one-way delay experienced by RNC-to-RN tunnel IP packets, the RN can detect if the IP backhaul network is congested or becoming congested. Thus, for example, the RN can be configured to send a congestion alert message to an upstream device such as the RNC if the average delay value exceeds some predetermined value.

In addition to monitoring the average delay values of the packets, the RN also monitors for a gap in the Abis numbers of the received packets. If the RN detects a gap in the Abis numbering of received packets, then the RN assumes that an RNC-to-RN tunnel IP packet has been dropped due to congestion in the EP backhaul network and sends a congestion alert message to an upstream device.

In some implementations, the RN transmits a congestion alert message to an RNC, e.g., RNC 18 shown in FIG. 1, which responds by limiting the forward-link data rate that it pushes into the IP backhaul network 22. To limit the forward-link data rate that is pushed to the backhaul network, the RNC employs a (1) data rate estimator and (2) a data rate limiter.

The data rate estimator may be implemented using a sliding window of packet size values and packet arrival time values to estimate the rate at which data is pushed to the IP backhaul network 22. The sliding window includes two circular arrays, one for packet size values of a number of packets and a second for packet arrival time values for the packets. The data rate estimator sums the packet size values of the first array and as new packets enter the RNC, the data rate estimator updates the sum by subtracting from the latest sum the oldest packet size value in the array and adding to the subtraction result the newest packet size value in the array. The data rate estimator also determines a time difference between the latest packet arrival time and the oldest packet arrival time by subtracting the oldest packet arrival time in the array from the arrival time of the newest packet. The average data rate is then computed by dividing the current sum of all the packet size values by the time difference between the newest packet arrival time and the oldest packet arrival time.

Figure 2:
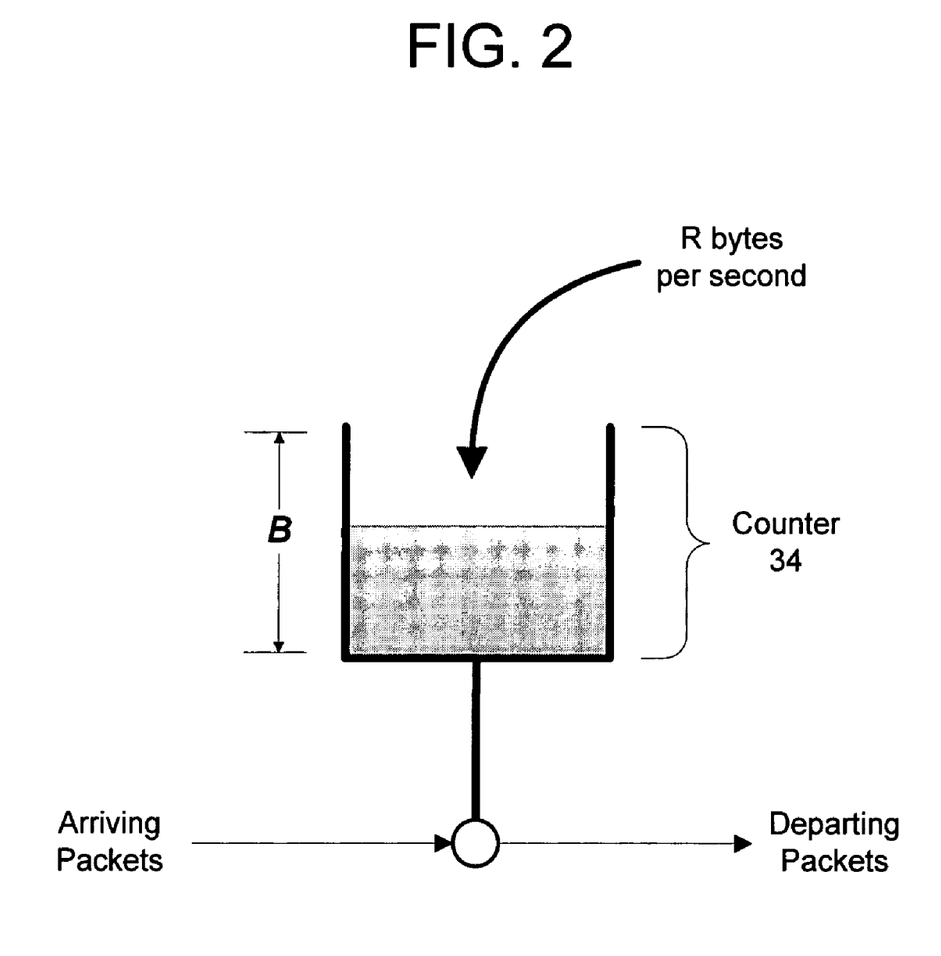
FIG. 2 is a diagram illustrating the operation of a leaky bucket mechanism.

The data rate limiter at the RNC is implemented using a leaky bucket mechanism illustrated in FIG. 2. The leaky bucket mechanism includes a counter 34 that represents the depth of the bucket. The counter 34 is incremented at a rate of R bytes per second, until a maximum value of B bytes is reached. When a packet is transmitted from the RNC 18 to the IP backhaul network 22, the counter 34 is decremented by an amount that is equal to the packet size and when the counter reaches zero (0) (i.e., the bucket is empty) no packets are transmitted. Thus, the average rate of transmission towards the RN is limited to a maximum of R bytes per second. The leaky bucket mechanism thus provides a means for controlling the rate at which the RNC pushes packets into the IP backhaul network 22. If the RNC decreases the value of R, the rate of transmission is slowed, whereas if the RNC increases the value of R, the rate of transmission is increased. B can be selected to be equal to the maximum burst size that can be transmitted out of the RNC towards the RN.

From a 1xEV-DO protocol perspective, the leaky bucket scheme is applied to data packets at the 1xEV-DO Abis layer on the processor card(s) in a RNC responsible for implementing the 1xEV-DO protocol stack. For example, as shown in FIG. 3, a leaky bucket scheme is applied to the 1xEV-DO Abis layer of a processor card.

Figure 3:
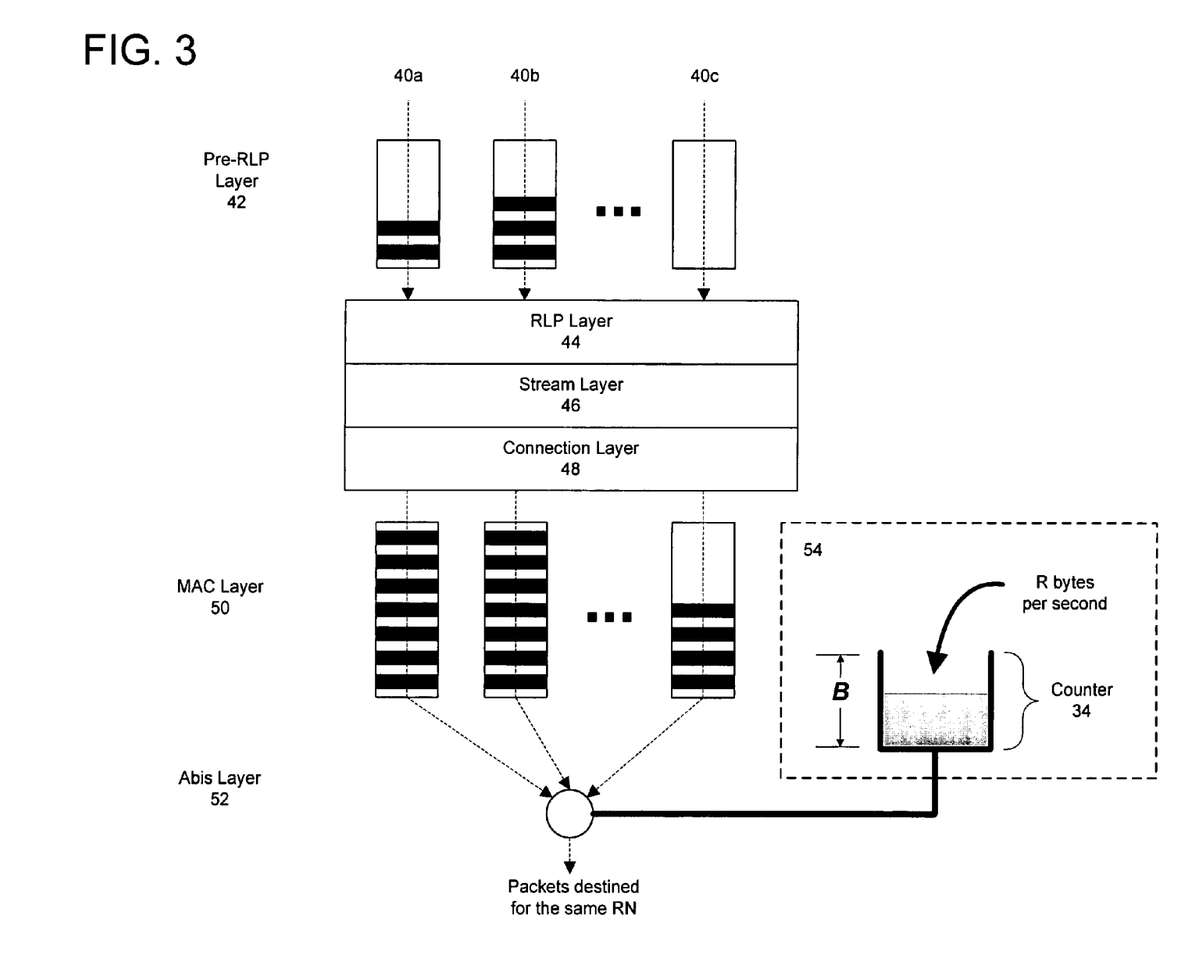
FIG. 3 is a diagram of a leaky bucket mechanism employed within the protocol layer stack of the 1xEV-DO protocol.

As shown in FIG. 3, a processor card processes several streams of packets 40a, 40b, 40c, each destined for an AT (e.g., Laptop 12 shown in FIG. 1) via a particular RN (e.g., RN 20 shown in FIG. 1). The processor card processes each stream of packets received from a PDSN through several layers defined by the 1xEV-DO protocol before transmitting the packets to the RN via the IP backhaul network. The layers defined by the 1xEV-DO protocol include a Pre-Radio Link Protocol (RLP) layer 42, a RLP layer 44, a stream layer 46, a connection layer 48, a Media Access Control (MAC) layer 50, and an Abis layer 52.

A leaky bucket mechanism 54 is applied at the Abis level 52 to regulate the rate at which packets destined for a particular RN are pushed to the IP backhaul network. As described above, if the bucket counter reaches zero, packet transmission to the RN is suspended. Suspension of packets does not mean that data packets are immediately dropped. Rather, suspended data packets will be queued in first the MAC layer and then the pre-RLP layer. If both queues become filled, then packets will be dropped following a drop-from-front policy at the pre-RLP layer. Thus, for example, packet streams 40a and 40b shown in FIG. 3 have their queues at the MAC level filled, and, therefore, if transmission of packets is suspended at the Abis layer, incoming packets will be queued at the pre-RLP layer. If the queue at the pre-RLP layer of one or more of the packet streams fills, then packets will be dropped from the front of the queue at the pre-RLP layer. The MAC queue assigned to packet stream 40c shown in FIG. 3 is not full, and, therefore, if transmission is suspended, packets will accumulate in the MAC queue before the queue at the pre-RLP layer is filled.

Dropping packets before entering RLP layer (and thus before packets are assigned an RLP sequence number) ensures that the AT will not see a gap in the RLP stream. Because the AT will not see a gap in the RLP stream, it will not request re-transmission of a packet as required by the 1xEV-DO protocol, which would exacerbate congestion in the IP backhaul network.

In operation, for example, the RN defaults to a "No-Congestion" state in which it assumes that there is no congestion. The RN remains in the default "No-Congestion" state until it detects a gap in the Abis numbering of a received packet stream, thus indicating that a packet has been dropped in the backhaul network.

If the RN detects that a packet has been dropped in the IP backhaul network, the RN enters a "Heavy Congestion" state, in which the RN immediately sends a "High Congestion Notification" alert (HCN) to the RNC and records the average one-way packet delay, $D_{drop}$, at the time the drop was detected. Note that $D_{drop}$ is a temporary indication of the delay values around which congestion is considered so high that it may lead to packet drops. This value may be used to set a threshold packet delay at which the RN will enter the "Heavy Congestion State".

Upon entering the Heavy Congestion state, the RN also starts an end-of-congestion timer of period $T_{end-cong}$ and a re-evaluation timer of period $T_{re-eval}$, where $T_{re-eval} <<  T_{end-cong}$. During operation of the re-evaluation timer, the RN continues estimating the average one-way packet delay, but refrains from sending any congestion notification to the RNC, even if more packet drops are detected. When the re-evaluation timer expires, the RN enters an "Incipient-Congestion" state. In this state, the RN continues to monitor the average one-way packet delay and Abis sequencing. If a dropped packet is detected while the RN is in the Incipient Congestion state, the RN stops the re-evaluation timer if it is running and re-enters the Heavy Congestion state.

If the end-of-congestion timer expires without detecting a dropped packet, the RN stops the re-evaluation timer if it is running and enters the No-Congestion state. As will be explained in more detail below, in some implementations the RNC is configured to gradually increase the rate at which packets are delivered to the IP backhaul network if it does not receive further congestion alert messages over time.

As previously mentioned, the RN continuously monitors the current average one-way delay ($D_{curr}$) of the received network packets. If $D_{curr}$ is detected to be larger than a threshold of $D_{cong}=\rho \times D_{drop}$ while the RN is in the Incipient Congestion state, the RN sends an Incipient Congestion Notification (ICN) to the RNC and restarts the re-evaluation timer. So long as the RN remains in the "Incipient-Congestion" state, no additional ICNs are sent before the re-evaluation timer expires (even if $D_{curr} > D_{cong}$). In other words, at most one ICN can be sent per $T_{re-eval}$ period. A good value for $\rho$ for some IP backhaul networks has been found to be 0.75.

Congestion can be due to any node in the backhaul network. It is also dynamic and unpredictable in the absence of any knowledge of the backhaul network. Therefore, it does not necessarily follow any specific pattern. Consequently, the one-way average packet delay at the time a packet drop occurs ($D_{drop}$), has temporary significance but is likely to change as time elapses. Accordingly, the RN updates $D_{drop}$ at the beginning of each congestion cycle, i.e., when a packet is detected as dropped. The RN periodically declares congestion over when no packet drops occur so that it drives the network to periodically test for an updated value of $D_{drop}$.

When the RN sends a congestion notification to the RNC, congestion in the IP backhaul network is not immediately reduced. Accordingly, the RN waits for a period of time (i.e., $T_{re-eval}$) before re-evaluating the degree of congestion in the network. To set a value for $T_{re-eval}$, one should consider the delay of sending a message upstream from the RN to the RNC (i.e., $D_{1-way-up}$). In addition, one should consider that when the RNC receives the congestion message, it immediately reduces the rate of transmission towards the RN from $R_1$ to $R_2$. The first few packets transmitted at the new (lower) rate $R_2$, encounter network queue depths that still correspond to the state of the network when the transmission rate is $R_1$. The very first one of those packets will arrive at the RN approximately after ($D_{1-way-up}+D_{curr}$). However, it is often better to wait to start evaluating the degree of network congestion corresponding to the rate $R_2$ until the network queues empty out the packets that were transmitted at rate $R_1$. A good value for $T_{re-eval}$ would therefore be ($D_{1-way-up}+2 \times D_{curr}$), or approximately ($3 \times D_{curr}$), which should account for the time needed to fill the sliding window of the delay estimator with packets transmitted at rate $R_2$. For a typical 1xEV-DO backhaul network, a good value for $T_{re-eval}$ has been found to be approximately 150 ms.

$T_{end-cong}$ should be set to a value large enough to allow the network to eliminate or significantly reduce the congestion in one congestion cycle and to minimize the frequency of dropped packets in the process of testing for $D_{drop}$. However, $T_{end-cong}$ should also be small enough so that throughput performance towards the RN is not degraded for an extended period of time due to an obsolete value of $D_{drop}$. A good value for $T_{end-cong}$ in a typical 1xEV-DO backhaul network has been found to be approximately 10 seconds.

In some implementations, RNC 18 (shown in FIG. 1) operates such that when the RNC 18 starts transmission of packets to its RNs (e.g., RN 20, 21 in FIG. 1), it assumes that there is no congestion in the 1P backhaul network 22. Therefore, the leaky bucket mechanism is either deactivated or its counter rate, R, is set at a level high enough that transmission is unrestrained towards the RNs. The RNC 18 continues to operate the data rate estimator such that it continuously maintains a circular array of packet sizes and time stamps on a packet-by-packet basis, but does not compute the estimated data rate on a packet-by-packet basis.

If the RNC processor card receives a High Congestion Notification (HCN) from an RN (e.g., RN 20), indicating that one of its packets have been dropped in the backhaul network, the RNC computes the average data rate $R_{avg}$ towards RN 20, and activates the leaky bucket mechanism for packets destined for RN 20 with a counter rate (R) set equal to ($\alpha \times R_{avg}$). Alpha ($\alpha$) should be a number less than 1, and, ideally is selected to be a value that is just enough to relieve the congestion. A good candidate value for $\alpha$ is 0.75 ($=1-2^{-2}$), which makes computation of ($\alpha \times R_{avg}$) efficient since it involves multiplying by a number to the power of two.

Note that in this implementation the RNC does not activate the leaky bucket mechanism for packets destined for other RNs serviced by the RNC, such as RN 21 shown in FIG. 1. This is because congestion often occurs in the communication link connecting an edge router in the IP backhaul network and the RN.

If the RNC processor card receives an Incipient Congestion Notification (ICN) from the RN, the RNC will computes the average data rate $R_{avg}$ towards the RN, and activates the leaky bucket scheme for that RN with a counter rate equal to ($\beta \times R_{avg}$). Beta ($\beta$) is a number is less than 1, and ideally should be selected to be a value that is just enough to relieve the congestion. A good candidate value for $\beta$ is 0.875 ($=1-2^{-3}$), which make computation of ($\beta \times R_{avg}$) efficient since it involves multiplying by a number to a power of two. If the leaky bucket mechanism for the RN is already activated when the RNC receives the ICN, the RNC will multiply the existing counter rate of the leaky bucket mechanism by a factor of $\beta$, thus further reducing the rate at which packets are fed into the IP backhaul network.

If the RNC does not receive any heavy or incipient congestion message for a time period $T_{inc}$, the RNC will increase its leaky bucket counter rate by a factor of $\gamma$. Gamma ($\gamma$) is preferably chosen to be less than $1/\alpha$, which provides for a gradual increase in the RNC's data delivery rate to the IP backhaul network. A good candidate value for $\gamma$ is 1.25 ($=1+2^{-2}$). Note that the value of $T_{inc}$ depends on several factors that are discussed below. The RNC continues to increase the leaky bucket counter rate by a factor of $\gamma$ every $T_{inc}$ in which no congestion alert messages are received.

If the RNC increases the counter rate of the leaky bucket to a value that is considerably larger than the estimated average data rate of transmission towards the RN, the RNC deactivates the leaky bucket mechanism.

The RNC time-stamps every Abis packet transmitted towards the RN with the CDMA current time as determined using a network time synchronization protocol such as the Simple Network Time Protocol (SNTP).

$T_{inc}$, which is the time that the RNC waits before increasing the leaky bucket counter rate, should provide enough time for the RN to send a congestion notification, if one is needed. Otherwise, the RNC may increase the data rate at a pace that is faster than the pace at which the RN can decrease the data rate. Therefore, $T_{inc}$ is preferably be set to account for the worst-case scenario. In such a scenario, the RN sends the first HCN (that takes a time amount of $D_{1-way-up}$ to reach the RNC), and waits for a time amount of ($3 \times D_{curr}$) before re-evaluating $D_{curr}$ again. If congestion remains, the RN sends a new congestion notification (ICN or HCN) to the RNC, which takes $D_{1-way-up}$ to reach the RNC. Therefore, the RNC should increase the leaky bucket counter rate if it does not receive any congestion notification during a period of ($4 \times D_{curr}$). To set $T_{inc}$ to ($4 \times D_{curr}$), the RNC needs the value of $D_{curr}$, which can be sent by the RN along with any congestion notification message.

While the above described implementations used a leaky bucket mechanism with a constant bucket depth of B, in other implementations the depth of the bucket B is dynamically adjusted based on the severity of congestion. For example, an RNC may set the parameter B at a lower level if it receives a high congestion message and may set B at a higher level if it receives an incipient congestion message. The $\alpha$ and $\beta$ multipliers discussed above may be used to adjust B, and the same values of $\alpha$ and $\beta$ may be used.

In some implementations, a congestion alert message triggered by an RN is sent upstream to the PDSN, which in turn takes measures to reduce the congestion. The PDSN can use the Explicit Congestion Notification (ECN) standard defined by the Network Working Group Request for Comments (RFC) 3168 "The Addition of Explicit Congestion Notification (ECN) to IP" (September 2001), which is incorporated herein by reference, to reduce the rate at which packets are fed into the backhaul network. In addition, the PDSN can use Random Early Detection (RED) to reduce congestion before becoming so severe that packets are dropped. RED is described in more detail in S. Floyd and V. Jacobson, "Random Early Detection gateways for Congestion Avoidance", IEEE/ACM Transactions on Networking V:1 N.4, August 1993, p. 397-413, which is also incorporated herein by reference.

When an RN, e.g., RN 20 shown in FIG. 1, detects congestion, it relays a congestion alert message for the ATs that it serves to the RNC, which, in turn, relays this information to the PDSN. In response, the PDSN sends an ECN to one or more of the mobile users associated with the ATs being serviced by the effected RN. Receipt of an ECN at the AT causes a higher-layer application on the ATs reduce the rate at which it requests data from a sever, e.g., server 30 shown in FIG. 1.

RED is a congestion avoidance algorithm that can be used in combination with ECN. A router without RED will simply drop new packets when the router's queue becomes full. A router with RED can drop incoming packets or can randomly mark a certain percentage of incoming packets with ECN based on the state of the router's queue. For example, a RED-enabled router can be configured to have two thresholds for its queues, one lower and one higher. When the queue size is below the lower threshold, it does not drop any packets. When the queue size is larger than the higher threshold, all new incoming packets are dropped. When the queue size is between the two thresholds, incoming packets are dropped with a certain probability that depends on the queue size, e.g., closer the queue size is to the higher threshold value, the probability that a packet will mark a packet with ECN increases.

Thus, rather than dropping packets at a router, the PDSN can use ECN marking (with or without also using RED) to cause the AT to request a slower data delivery rate from a sever, which, in turn, reduces the rate at which packets are transmitted to the IP backhaul network by the RNC.

ECN marking works by setting the CE bit in the IP header, and when the client receives the packet with the CE bit set. Protocols such as Transmission Control Protocol (TCP) and Datagram Congestion Control Protocol (DCCP) support such congestion control mechanism. When a device that supports one of these protocols gets an IP packet with the CE bit set, then it does the congestion control as if the packet was lost. For example, ECN-capable TCP server should halve the TCP congestion window size upon getting the ECN indication.

Note that one IP packet with the CE bit set should be counted as one packet loss for congestion control purpose purposes since the router who sets the CE bit is doing so instead of dropping it.

An ECN-capable transport sender sets the ECN-Capable Transport (ECT) bit in the IP header to indicate to the router that the end points of the transport protocol are ECN-capable. Routers capable of ECN check this bit and will drop packets if there is no ECN support between end hosts (i.e., the ECT bit is not set) or set the CE bit if ECN is supported (i.e., the ECT bit is set).

ECN can be vulnerable if there are non-compliant end nodes that set the ECT bit but do not react to CE bit. Therefore, in some implementations routers in the IP backhaul network are configured to drop packets in case of severe congestion, e.g., when the average queue size exceeds a certain threshold, even if they are ostensibly from an ECN-capable host.

When an EP packet is encapsulated for tunneling by a device within a radio access network, the ECN information in the outer IP packet needs to be transferred to the inner IP packet at the receiving end of the tunnel. For example, IP packets that are to be sent via an air link by the RAN 10 shown in FIG. 1 are encoded by Point-to-Point (PPP)/High-Level Data Link Control (HDLC) and RLP, fragmented, and encapsulated before going through the RNC-to-RN tunnel. Therefore, supporting congestion avoidance in RAN requires propagating the ECN information from the transport IP packets to the user IP packets.

Provided that ECN-capable transport is used between the end hosts and the IP backhaul network supports ECN, a server at an end host, e.g., server 30 shown in FIG. 1, and a client at an AT can open a channel over ECN-capable transport. When the server sends an IP packet to the client, it sets the ECT bit in the IP header to indicate to routers that end points are ECN-capable. When the IP packet arrives at the RNC, the RNC generates RLP packet(s) from the IP packet and these RLP packets are transmitted, along with the IP packet, to the RN over the IP backhaul network. Note that the RNC must use an ECN-capable transport (e.g., DCCP) to tunnel packets to the RN.

When a router in the IP backhaul network detects congestion, it uses a RED scheme to mark some IP packets with ECN. When the transport layer at the RN receives RLP packets with the CE bit set in the IP header and thus detects congestion.

Ideally, the CE bit of the user IP packet should be set whenever any part of it is ECN marked while transmitted over the backhaul. However, setting the CE bit requires modifying the user IP packet. Setting the CE bit at the RN is possible, but is difficult since the packet is already PPP/HDLC/RLP encoded. Doing it at the AT requires some method of signaling from the RN to the AT to indicate that some IP packets need to be ECN marked, which would require changes in the current 1xEV-DO standard.

Another way to mark the CE bit of the user IP packet (which will trigger the AT to request a reduced transmission rate), is to have the RNC set the CE bit of incoming IP packets before it tunnels them. Thus, for example, when an RN receives an RNC-to-RN tunnel packet with the CE bit set, it sends a congestion alert to the RNC. In response, the RNC begins setting the CE bit of incoming user IP packets that have their ECT bit set and that are destined to the RN that sent the congestion alert. Note that the incoming user IP packets to be ECN marked do not have to belong to the same user whose Abis packet was ECN marked since the goal is to reduce the backhaul load from the RNC to the RN. However, in some implementations, the RNC may be configured to mark only incoming IP packets belonging to the same QoS class of the RNC-to-RN tunnel packet that was marked by a router in the backhaul network.

If, after receiving a congestion alert, the RNC does not see any incoming packets with ECT bit set after a certain amount of time, then the RNC can be configured to revert to dropping IP packets or slowing the rate it pushes packets to the IP backhaul network (e.g., using the leaky bucket mechanism described above). However, the fact that there are no more IP packets with the ECT bit set when a congestion notification has been sent in response to one indicates the traffic that caused the congestion indication has already been slowed down. Therefore, packet dropping or further slowing traffic into the IP backhaul network would not be necessary.

Using ECN to control congestion introduces a delay between the time when congestion is detected and when corrective action is taken since the ECN marking is not done to the IP packet experiencing congestion, but to a different IP packet that arrives after the problematic packet. Such a delay is less important where ECN marking is used to avoid congestion (which does not require a very fast reaction) versus congestion control in reaction to packet losses (which requires prompt attention).

Note that regardless of whether the CE bit has already been set when the RNC tries to set it, the RNC can simply set the bit by performing an OR function with logical one and whatever value is in the CE bit.

If either communication end point (e.g., AT 12 and the host server 30 shown in FIG. 1) do not support ECN, then setting the CE bit of user IP packets at the RNC will not have any effect. In this case, the RAN may be configured to drop a user IP packet when there is an Abis packet with the CE bit set. Dropping the user IP packet can be done either at the RNC or at the RN. If the RAN is configured to have the RNC drop the packet, the RN transmits a congestion alert notification to the RNC when it sees that an RNC-to-RN tunnel packet has its CE bit set, and, in response, the RNC drops an incoming user IP packet before it is sent to the RLP layer. By dropping packets at the RNC (rather than at the RN), packets can be dropped prior to RLP encoding, which means that an AT will not automatically ask for retransmission of the packet (thus potentially exacerbating congestions). In other embodiments, the RAN can also employ the leaky bucket mechanism described above to slow the rate of delivery of data to the IP backhaul network.

As an alternative, the RN can be configured to replace the payload (i.e., the RLP octet) of an incoming RNC-to-RN tunnel packet with random data if the tunnel packet has its CE bit set. For this to work, however, information about whether the user IP packet has its ECT bit set needs to be communicated to the RN so that the RN can insert the random data when the corresponding user IP packet has the ECT bit set. One way to communicate the ECT bit status information to the RN is to copy the ECT bit from the user IP packet to the RLP packet(s) corresponding to the IP packet (this requires the PDSN function to be implemented in the RNC). When the AT receives the packet with the random data, it knows that a packet has been dropped and it will request data transmission at a reduced rate under the PPP/HDLC protocol. Note that this alternative notifies the AT of congestion sooner than dropping pre-RLP packets since the AT will see IP packet drops sooner. However, the downside of this approach is that it transmits a packet to RN that will be effectively dropped.

Another approach is to copy the ECN bit from the user IP packet to the Abis packet. This way, the routers will simply drop Abis packets rather than setting the CE when there is congestion. As explained in more detail below, the RN can insert random data packets in place of a dropped packet to avoid RLP retransmissions.

In some implementations, the RN snoops the RLP packets and replaces a dropped RLP packet with an RLP packet that contains the correct (in-sequence) RLP sequence number but incoherent RLP payload. This will cause the AT to pass RLP data in-sequence to the higher-layer application, but will cause the higher-layer application to detect the loss (e.g., at PPP) and react to congestion by reducing its data rate.

While replacing a dropped RLP packet with a "garbage" RLP packet consumes the air link bandwidth, this is usually an acceptable side-effect since the backhaul is likely to be congested when the air link has excess bandwidth in comparison to the available bandwidth of the backhaul network.

While some packet loss may be random and not caused by congestion in the backhaul network, such random packet losses are rare, and, accordingly, a congestion relief system can be configured to simply fill all gaps in the RLP sequence with a replacement RLP packet having the correct RLP sequence number and a garbage payload.

Packet loss in the backhaul can be detected by the RN since all (data) packets are sequence numbered (RLP SQN). Loss of a RLP retransmitted packet is not detectable this way and, to detect loss of a retransmitted packet, requires some sequence numbering at the Abis layer. However, since RLP retransmissions are not frequent and since there are no further retransmissions for a RLP retransmission by RLP, some implementations may simply not detect RLP retransmission drops.

In some implementations, the RN is configured to estimate the extent of the backhaul network congestion by determining the rate of CE bits set in the incoming Abis packets. In implementations where there is some randomness in setting the CE bit (e.g., RED algorithm is used), some low pass filtering can be used for such estimation. The rate of set CE bits in a packet stream can be used to determine whether a detected packet loss is due to congestion or is simply a random loss. For example, a RN detects a packet loss at a time when the rate of set CE bits is very low (or zero), the RN may assume that the packet loss is random and will not send any congestion notification messages. However, if the packet loss is detected at a time when the rate of set CE bits is high, the RN may assume that congestion caused the packet drop and will take some action to alleviate congestion (e.g., send a congestion alert to the RNC, replace a dropped RLP packet with a garbage RLP packet). While this approach increase the chances for lost data due to a random error to be recovered by RLP, the technique may not be effective if a significant number of routers in the IP backhaul network do not support ECN as there may not enough instances of CE bit sets to tell the difference between random packet loss and packet loss due to congestion.

More particularly, random data (or "garbage") can be inserted into HDLC frames without causing HDLC to misbehave. The following shows the frames defined by the HDLC protocol:

| Flag | Address | Control | Protocol | Information | CRC | Flag |
|------|---------|---------|----------|-------------|-----|------|
| 01111110 | 11111111 | 00000011 | 8/16 bits | * | 16/32 bits | 01111110 |

Flag: always 0x7e indicating a start of a new frame
Address: 0xff indicates all receivers are to accept the frame
Control: 0x3 indicates an unnumbered frame
Protocol: specifies the protocol used in the payload, e.g., IP
Information: payload with byte stuffing
CRC: 16 or 32 bit CRC Byte stuffing is done to prevent the flag octet (0x7e), control escape octet (0x7d), or other such special octets from appearing in the information field. This is done by replacing such octet in the information field by 0x7d followed by the original octet XOR'd by 0x20.

When the AT decodes the frame using the PPP-HDLC protocols, it will detect an invalid packet in the following cases:

Only one Flag Sequence is required between two frames. Two consecutive Flag Sequences constitute an empty frame, which is silently discarded, and not counted as a FCS error.

Frames with unrecognized addresses SHOULD be silently discarded.

Frames with unrecognized Control field values SHOULD be silently discarded.

Frames which are too short (less than 4 octets when using the 16-bit FCS), or which end with a Control Escape octet followed immediately by a closing Flag Sequence are silently discarded, and not counted as a FCS error.

The FCS field is calculated over all bits of the Address, Control, Protocol, Information and Padding fields, not including any start and stop bits (asynchronous) nor any bits (synchronous) or octets (asynchronous or synchronous) inserted for transparency. This also does not include the Flag Sequences nor the FCS field itself. When the FCS fails, it is counted as a FCS error and the frame is discarded.

When some parts—possibly as a non-contiguous set of chunks—of one or more HDLC frames are replaced by flag octets (0x7e) to cause CRC failures intentionally for the affected frames, we now show that this will be successful with a very high probability.

Since original frames are delimited by flags, converting other non-flag data into flags simply create shorter HDLC frames, but this process does not concatenate multiple HDLC frames into one. Therefore, it is general enough to consider whether the PPP/HDLC decoder would consider a contiguous subset of a one HDLC frame (without flags) as a valid frame. Note that by the four conditions described above, any such subset containing an unrecognized address or an unrecognized control field will be silently discarded. Furthermore, any such subset less than 4 octets (with 16-bit CRC is used) will also be discarded. A subset that still passed all these tests will be CRC tested and will fail with a high probability, e.g., $1.5*10^{-5}$ if 16-bit CRC and $2.3*10^{-10}$ if 32-bit CRC.

Note that there is about 1% probability for a physical layer packet containing a corrupted HDLC frame to be lost and retransmitted by the RLP. If the retransmitted octets arrive at the AT without corruption, then it may not cause a CRC failure. Once could implement at the RN to corrupt such retransmitted octets that were previously corrupted. But, since this happens so infrequently, i.e., with probability of about 1%, it can be skipped in a simple implementation.

In other implementations, the RN sends a signaling message to the AT to indicate the sequence numbers of the lost octets when there is an RLP packet loss. The AT does not send RLP NAK for the missing octets if it receives such a message. This will enable the higher layer to see packet drops immediately, thus reducing the reaction time to congestion. However, in order to use messaging to prevent the AT from requesting retransmission would require a modification to the current 1xEV-DO protocol.

A number of embodiments of the invention have been described. Nevertheless, it will be understood that various modifications may be made without departing from the spirit and scope of the invention. Accordingly, other embodiments are within the scope of the following claims.

What is claimed is:

1. A method for reducing congestion in a radio access network, the method comprising:
    monitoring, at a radio node, congestion in a stream of data packets that is received at the radio node from a radio network controller over a network and that is to be sent over an air link to one or more access terminals, wherein monitoring the congestion comprises:
        monitoring numbers of the stream of data packets for a gap in sequential numbering associated with the stream of data packets; and
        monitoring a one way delay in the stream of data packets; and
    reducing a rate at which the stream of data packets is sent by the radio network controller over the network to the radio node in response to the monitoring, wherein reducing the rate at which the stream of data packets is sent over the network to the radio node comprises:
        reducing a rate at which the radio network controller transmits data packets into the network, wherein reducing the rate at which the radio network controller transmits the data packets into the network comprises:
        using a leaky bucket mechanism to reduce the rate at which the data packets enter the network, wherein using the leaky bucket mechanism comprises:
            incrementing a counter at a rate of R bytes per second;
            decrementing the counter by an amount proportional to a size of a data packet that is transmitted to the network; and
            preventing data packets from being transmitted to the network if the counter reaches zero.

2. The method of claim 1 wherein monitoring the congestion further comprises:
    sending a congestion alert message to the radio network controller if at least one of the gap in the sequential numbering is detected by monitoring the numbers, or the current average of the one way delay exceeds a predetermined value; and wherein reducing the rate in response to the monitoring further comprises:
reducing the rate in response to the congestion alert message.

3. The method of claim 1 wherein monitoring the congestion comprises determining how long it takes at least some data packets of the stream of data packets to travel over the network.

4. The method of claim 3 wherein determining how long it takes the at least some data packets comprises:
comparing a current time with an indicator included in a data packet of the at least some data packets; the indicator indicating an approximate time when the data packet entered the network.

5. The method of claim 1 further comprising:
marking data packets in the stream of data packets if congestion is detected.

6. The method of claim 5 wherein monitoring the congestion comprises:
determining how many received data packets of the stream of data packets over time are marked data packets.

7. The method of claim 1 wherein reducing the rate at which the stream of data packets is sent over the network to the radio node comprises:
marking a data packet with information that signals an access terminal to reduce a rate at which the access terminal requests delivery of data over the air link.

8. The method of claim 1 wherein reducing the rate at which the stream of data packets is sent over the network to the radio node comprises:
replacing content of a data packet with random data, wherein receipt of the data packet with random data signals an access terminal to reduce a rate at which the access terminal requests delivery of data over the air link.

9. The method of claim 1 wherein reducing the rate at which the stream of data packets is sent over the network to the radio node comprises:
dropping packets destined for an access terminal prior to the packets entering the network and prior to the packets being associated with the sequential numbers.

10. A radio access network comprising:
a backhaul network;
a radio network controller configured to receive a stream of data packets destined for an access terminal and to transmit the stream of data packets to a radio node via the backhaul network; and
a radio node configured to receive the stream of data packets and transmit the stream of data packets to the access terminal via an air link, wherein the radio node is configured to monitor congestion in the stream of data packets, wherein monitoring the congestion comprises monitoring numbers of the stream of data packets for a gap in sequential numbering associated with the stream of data packets and monitoring a one way delay in the stream of data packets;
wherein the radio access network is configured to:
cause a reduction in a rate at which the stream of data packets enters the backhaul network in response to monitoring the congestion;
cause the reduction in the rate at which the stream of data packets enters the backhaul network by reducing the rate at which the radio network controller transmits data packets into the backhaul network;
wherein the radio network controller comprises a leaky bucket mechanism which is configured to control the rate at which the stream of data packets enters the backhaul network,
wherein the leaky bucket mechanism is configured to increment a counter at a rate of R bytes per second, to decrement the counter by an amount proportional to a size of a data packet that is transmitted to the network, and to prevent data packets from being transmitted to the network if the counter reaches zero.

11. The radio access network of claim 10 wherein the radio network controller is configured to sequentially number each packet in the stream of data packets prior to the stream of data packets entering the backhaul network.

12. The radio access network of claim 11 wherein the radio network controller is configured to number each packet sequentially in accordance with Radio-Link Protocol.

13. The radio access network of claim 10 wherein monitoring the one way delay comprises using a sliding window of packet delay values to estimate a current average of the one-way delay.

14. The radio access network of claim 10 wherein the radio network controller is configured to determine how long it takes at least some data packets of the stream of data packets to travel over the backhaul network.

15. The radio access network of claim 14 wherein the radio node is configured to determine how long it takes the at least some data packets to travel over the backhaul network by comparing a current time with an indicator included in a data packet of the at least some data packets; the indicator indicating an approximate time when the data packet entered the backhaul network.

16. The radio access network of claim 15 wherein the radio access network is configured to cause the reduction in the rate at which the stream of data packets enters the backhaul network by dropping packets destined for an access terminal prior to the packets being sequentially numbered.

17. The radio access network of claim 10 wherein the backhaul network comprises a plurality of network devices at least some of which are configured to mark data packets in the stream of data packets if the network device detects congestion.

18. The radio access network of claim 17 wherein the radio node is configured to determine how many received data packets of the stream of data packets over time are marked data packets.

19. The radio access network of claim 10 wherein the radio access network is configured to cause the reduction in the rate at which the stream of data packets enters the backhaul network by marking a data packet with information that signals an access terminal to reduce a rate at which the access terminal requests delivery of data over the air link.

20. The radio access network of claim 10 wherein the radio access network is configured to cause the reduction in the rate at which the stream of data packets enters the backhaul network by replacing content of a data packet with random data, wherein receipt of the data packet with random data signals an access terminal to reduce a rate at which the access terminal requests delivery of data over the air link.

21. A method for reducing congestion in a radio access network, the method comprising:
monitoring congestion in a stream of data packets that is received at a radio node from a network and that is to be sent over an air link to one or more access terminals; and
reducing a rate at which the stream of data packets is sent over the network to the radio node in response to the monitoring;

wherein reducing the rate at which the stream of data packets is sent over the network to the radio node comprises replacing content of a data packet of the stream of data packets with random data, wherein receipt of the data packet with random data at an access terminal signals the access terminal to reduce a rate at which the access terminal requests delivery of data over the air link.

22. The method of claim 21 wherein monitoring the congestion further comprises:

sending a congestion alert message to the radio network controller if at least one of the gap in the sequential numbering is detected by monitoring the numbers, or the current average of the one way delay exceeds a predetermined value; and wherein reducing the rate in response to the monitoring further comprises:

reducing the rate in response to the congestion alert message.

23. The method of claim 21 wherein monitoring the congestion comprises:

using a sliding window of packet delay values to estimate a current average of the one way delay.

24. The method of claim 21 wherein monitoring the congestion comprises determining how long it takes at least some data packets of the stream of data packets to travel over the network.

25. The method of claim 24 wherein determining how long it takes the at least some data packets comprises:

comparing a current time with an indicator included in a data packet of the at least some data packets; the indicator indicating an approximate time when the data packet entered the network.

26. The method of claim 21 further comprising:

marking data packets in the stream of data packets if congestion is detected.

27. The method of claim 26 wherein monitoring the congestion comprises:

determining how many received data packets of the stream of data packets over time are marked data packets.

* * * * *

UNITED STATES PATENT AND TRADEMARK OFFICE
CERTIFICATE OF CORRECTION

PATENT NO. : 7,626,926 B2  
APPLICATION NO. : 11/007899  
DATED : December 1, 2009  
INVENTOR(S) : Firas Abi-Nassif Page 1 of 1

It is certified that error appears in the above-identified patent and that said Letters Patent is hereby corrected as shown below:

Column 15, line 12, delete – "packets;" and insert --packets--.

Column 16, line 30, delete – "packets;" and insert --packets--.

Column 18, line 12, delete – "packets;" and insert --packets--.

Signed and Sealed this

Twenty-sixth Day of January, 2010

David J. Kappos
*Director of the United States Patent and Trademark Office*

UNITED STATES PATENT AND TRADEMARK OFFICE
CERTIFICATE OF CORRECTION

PATENT NO. : 7,626,926 B2
APPLICATION NO. : 11/007899
DATED : December 1, 2009
INVENTOR(S) : Abi-Nassif et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 655 days.

Signed and Sealed this

Twenty-first Day of December, 2010

David J. Kappos
*Director of the United States Patent and Trademark Office*